United States Patent Office 3,072,582
Patented Jan. 8, 1963

3,072,582
POLYETHER-URETHANE FOAMS AND METHOD OF MAKING SAME
Charles Bedell Frost, Glendora, Calif., assignor to The General Tire & Rubber Company, Akron, Ohio, a corporation of Ohio
No Drawing. Filed Apr. 1, 1959, Ser. No. 803,381
17 Claims. (Cl. 260—2.5)

This invention relates to polyether-urethane foams. It relates particularly to a method of making cellular or foamed polyether-urethanes by using additives to produce at least part or all of the bubbles or porosity in the foam and to the foamed polyether-urethane itself.

This application is a continuation-in-part of my co-pending application Serial No. 541,823, entitled "Polyurethane Foams and Method of Making Same," and filed October 20, 1955, now abandoned.

In the past, polyether-polyol-polyisocyanate foams have been made by reacting a nonlinear slightly branched polyether glycol or polyol with a diisocyanate or by reacting a linear ether glycol with a mixture of di- and triisocyanates. An excess of diisocyanate over that needed to react with the polyether glycol to form the polyurethane is generally used to provide a small amount of isocyanate groups for reaction with a small amount of water which is generally present to cooperate with the isocyanate in forming carbon dioxide.

The diisocyanate is added both to build up the polyether to a high molecular weight, to crosslink and to provide the necessary $CO_2$. Linear polymers alone do not change usually from the liquid state to the solid state quickly enough to trap any gases evolved and to enable a foamed product to be formed. The crosslinking has been necessary to trap and hold gases in order to obtain a low density, cellular foamed polyurethane product.

The principle followed, therefore, was to add sufficient quantity of diisocyanate to the polyether so that there was enough not only to build up the polyether and crosslink it, but also to enable sufficient carbon dioxide to be formed to develop the desired porosity in the material.

In one method of making cellular polyurethanes or foamed polyether diisocyanate reaction products, a liquid polyether is pumped at a controlled rate through a nozzle of a foaming machine. Polyisocyanate, preferably a diisocyanate, is pumped at high pressure to the nozzle, where it contacts the stream of polyether and is thoroughly mixed therewith because of its high velocity. A small amount of water is also introduced into the nozzle either as a stream or in admixture with the polyether. Suitable crosslinking agents and reaction catalysts, such as 1,3-proplyene glycols and certain tertiary amines, are also preferably mixed with the polyester or introduced into the nozzle. A stirrer is also generally present in the nozzle to insure homogeneous mixing. From the nozzle, the material is delivered to a suitable mold, such as an open pan, which is moved in a continuous manner relative to the nozzle to provide the desired layer of viscous reactants on the bottom of the pan or mold.

The bottom of the pan may contain upright cylindrical wooden pegs or cores so that the bottom surface of the polyurethane foam is formed with cored openings such as round cylindrical-shaped voids. These holes not only save material but allow a portion of the polyurethane foam to be of a higher density for a given load-deflection characteristic.

Polymerization starts as the materials are mixed and the semi-fluid mass is discharged to large pans. The material mixing is very important. It is important that the diisocyanate and catalyst be almost immediately and completely dispersed in the polyether. The rate of polymerization is relatively fast and the mass is shaped by the contour of the pans. Carbon dioxide is evolved in the gaseous state from the time of mixing so that the bubbling and frothing occurs during the mixing, discharging and shaping stages.

The time and place at which release of the gas by the isocyanate occurs cannot be controlled, as it is evolved as a result of the reaction between the diisocyanate and water. One of the disadvantages of this uncontrollable release of gas is the formation of a solid crust on the top surface of the polyurethane foam, which is substantially solid nonporous polyurethane, because there is loss of $CO_2$ from the surface before the polyurethane is strong enough to hold the $CO_2$ as bubbles to provide cellular foam. The crust must be cut off before further use with great waste. Although polyester liquid for reuse can be recovered from the crust by a high temperature steam treatment, this is expensive. Also, the surfaces next to any pegs are solid and undesirable.

Attempts to mix carbon dioxide gas with the polyether and to use less of the expensive isocyanate have been unsuccessful, because the strength of the film, when the gas back pressure is reduced to atmospheric, has been insufficient to maintain cellular form, and because the carbon dioxide is neither sufficiently easily liquefiable nor sufficiently soluble in the reactants to be evolved only gradually.

While the method formerly used is effective to some extent, there are serious limitations to producing foamed polyurethanes in this manner. The diisocyanate is very expensive; the very substantial excess used to react with water to evolve carbon dioxide in the gaseous state represents an economic limitation. Another drawback is the formation of substituted urea by-products of the water-diisocyanate reaction. This by-product is reactive and enters, to some extent, the crosslinking reactions which produce undesirable stiffness where flexible-type foam products are desired. Also, the product, when used in a cored mold, foams with regions of high density in contact with the core member with the result that the benefits of cored molds are lost.

It, therefore, is an object of the present invention to provide a method for making rigid to flexible cellular polyurethanes and which can be used successfully in cored molds.

A further object of the present invention is to provide a method for producing cellular polyurethanes of low density which are rigid, semi-rigid or flexible and which have less shrinkage at low density than those heretofore produced.

Another object is to produce a superior, stable polyether-urethane foam with less expensive polyisocyanates.

These and other objects and advantages of this invention will be more apparent to those skilled in the art from the following detailed description and examples.

It is not known whether or not the by-product substituted urea from the diisocyanate-water reaction contributes to the aforementioned crusting effect adjacent pegs and surfaces when the prior process was used, but, in accordance with the present invention I have discovered that a blowing agent of an easily liquefied or vaporized material stable and inert to polyisocyanate and polyether, particularly a gas soluble in the polyether or polyisocyanate in the liquid state, can be used as the gas source with marked advantages. It eliminates or greatly reduces these undesirable high density portions and accomplishes the above and other desirable objects of the invention. Moreover, a material such as an easily liquefied gas in the liquid state can be relatively easily dispersed in the polyether and little or no modification of the usual equipment is necessary, other than suitable means for mixing the liquefied gas into the polyether. When the blowing agent is quite soluble in at least one of the reactants and is mixed therein, a pressure drop below that of the gas alone at a given temperature occurs and increased fluidity of the reactant such as the polyether, occurs with resultant permissive use of a higher viscosity reactant. Inasmuch as the liquefied gas is a source of gas for expansion of the polyurethane into a foam, much less expensive polyisocyanate is required. Also, the water previously introduced for reaction with the diisocyanate is not needed, and the amount of substituted urea by-product of the water-diisocyanate reaction is thereby reduced and shrinkage upon set is appreciably less, so that lighter, reinforced articles can be made. This is especially desirable when the cellular product is used for foamed-in-place insulation or reinforcement.

The nonsoluble gas producing liquid blowing agents should be dispersed as fine globules in the polyether or other reactant used and should be relatively stable. The finely dispersed globules of the liquefied gas will provide for a relatively uniform end-product. When the liquefied gas is soluble in the polyether, it may, because of this solubility, have a lower boiling point at atmospheric pressure. The higher the solubility the lower may be the boiling point. The boiling point of the blowing agent should be below about 110° C. and preferably below about 50° C.

The heat of reaction breaks the small globules or reduces the solubility of the liquefied gas in the polyether or polyisocyanate to cause blowing, usually after the polyurethane reaction has proceeded far enough to trap the released gas.

A uniform and, therefore, relatively stable dispersion of the liquefied gas is desirable, although a liquefied gas that is soluble in the polyether is preferred.

Appreciably solubility of the liquefied gas in the polyether or polyisocyanate is, I have found, important, as it provides a method of controlling the release of the gas, because release is accelerated by heat of the condensation reaction. For the first time, therefore, it is now possible to improve upon the timing of the concurrent reactions of (1) network formation, and (2) gas release so that the stiffening of the polyurethane occurs before or just about the time the gas is released so that the gas remains trapped even in surface layers.

It is desirable that the liquefied gas be inert to the reactants and be stable so that it does not decompose to adversely affect the foam. For example, it is desirable that the liquefied gases be nonacidic when an alkaline catalyst such as a tertiary amine is present.

In general, the blowing agent should be easy to liquefy and should be of such solubility in the polyether and/or isocyanate and/or catalyst phase that its vapor pressure is greatly reduced and, therefore, capable of being handled without expensive high pressure apparatus. However, the liquefied gas, as aforesaid, may be relatively insoluble, but then it must be of such a nature that it can be finely dispersed in the liquid polyether or even the isocyanate if liquid. Of course, the liquefied gas blowing agent, whether dissolved or dispersed, should have a reasonably high vapor pressure at room temperature. When the reactants are not sufficiently cooled to remove the exothermic heat rapidly, advantage may be taken of the higher boiling liquefied gases in the range. Foam expansion will, therefore, occur when the gas is formed by a temperature above its boiling point.

Depending upon the foamed product desired, a blend of soluble and relatively insoluble liquefied gases also may be employed to produce desirable polyurethane foamed products.

If the liquid blowing agent boils at about room temperature and the polyether-polyol or the prepolymer is a liquid at room temperature, mixing of these materials is facilitated. However, if the blowing agent boils substantially below room temperature, it may chill the polyether or prepolymer to increase its viscosity but this can be overcome by vigorous stirring. The mixing may have to be conducted under pressure or in an enclosed chamber if the blowing agent tends to escape, particularly, if the polyether or prepolymer need to be heated to liquefy them prior to reaction. Preferably, the reactants are mixed rapidly in a foaming nozzle or machine and then the reaction mixture is dumped rapidly into a mold and the like so that proper urethane network formation and foaming occur before there is chance for substantial loss of the blowing agent.

The inert stable blowing agents used in the practice of the present invention are the lower molecular weight alkanes and alkenes, halogen substituted lower molecular weight alkanes and the lower molecular weight dialkyl ethers. The preferred class of materials are the alkanes and the fluoro substituted alkanes. Specific examples of materials which can be used are tri-chlorofluoromethane, di-chlorofluoromethane, di-chlorotetrafluoroethane, tri-chloro trifluoro ethane, ethyl chloride, methane, ethane, ethylene, propane, propylene, pentane, hexane, heptane, ethyl ether, diisopropyl ether, etc.

From about 2 to 40% by weight based on the total weight of the polyether urethane forming materials is generally used. It, however, is preferred to employ from about 9 to 30% by weight of the blowing agent based on the total weight of the polyether-urethane forming materials.

The extent of solubility of two useful liquefied gases, namely dichlorodifluoromethane and monochlorodifluoromethane, in two different solvents is shown in Table I below:

*Table I*

| Solute | Solubility in Solvent "I" | | Solubility in Solvent "II" | |
|---|---|---|---|---|
| | grams/gram | moles/gram | grams/gram | moles/gram |
| $CCl_2F_2$ | 0.215 | 0.282 | 0.458 | 0.380 |
| $CHClF_2$ | 1.090 | 0.740 | 1.127 | 0.678 |

In Table I, solvent "I" was the dimethyl ether of tetraethylene glycol, and solvent "II" was the diethyl ether of diethylene glycol. The solubilities were determined at 32.2° C. with a pressure of the halogenated hydrocarbon corresponding to its vapor pressure at about 40° F. Monochlorodifluoromethane is about four times as soluble on a weight basis as dichlorodifluoromethane. These gases become more soluble at lower temperatures. $CCl_2F_2$ has a vapor pressure of 98.7 p.s.i. absolute at 80° F., while $CHClF_2$ has a vapor pressure of 158 p.s.i. absolute at 80° F.

Foams produced may be either rigid, semi-rigid or flexible. Rigid foams are obtained by using a large portion of or entirely branch chain polyethers, preferably of rather low average molecular weight, and polyols (polyhydric alcohols). The semi-rigid foams are obtained by using a proportion of linear polyether-glycols and diols in the reaction mixture while the flexible foams are obtained by using an even larger proportion of linear reactants. Semi-rigid and flexible foams may also be obtained by using high average molecular weight branched polyether polyols. Moreover, diisocyanates, triisocyanates and isocyanates having more than three isocyanato groups may be employed in making the foams. For example, one may react a linear polyether glycol with a diisocyanate to obtain a chain extended isocyanate terminated prepolymer which then may be reacted with glycerol, pentaerythritol, etc. in the presence of excess isocyanate to form a rigid network. Another way is to react a branch chain polyether polyol with excess diisocyanate and complete the crosslinking with glycerol or more branch chain polyether polyol. Various combinations of the reactants can be employed to obtain the desired network, crosslinking, degree of rigidity or flexibility and the like.

Examples of useful branch chain polyether polyols containing a plurality of functional hydroxyl terminal groups are the reaction products of glycerol, trimethylol propane, pentaerythritol, 1,2,6-hexane triol, phloroglucinol, trimethylol benzene, trimethylol phenol, styrene-vinyl alcohol copolymer, sucrose, sorbitol and similar polyhydric materials reacted with glycols and the like such as propylene glycol, butylene glycol, mixtures of ethylene and propylene glycol and the like in the presence of catalysts with removal of water. They also may be reacted with alkylene oxides such as propylene oxide, butylene oxide, mixtures of ethylene oxide and propylene oxide and the like. Mixtures of the monomers forming the polyether polyols as well as the mixtures of the branched chain polyether polyols themselves may be used.

The branch chain polyether polyols have at least 3 functional hydroxyl radicals but may have up to 8 or more functional hydroxyl radicals.

Examples of linear or substantially linear polyether polyols are those polyalkylene ether glycols derived from alkylene oxides, glycols, heterocyclic ethers and other materials by polymerization, copolymerization and the like. For example tetrahydrofuran may be polymerized in the presence of catalytic amounts of fluoro sulfonic acid to make a polytetramethylene ether glycol having the formula:

$$HO(-CH_2CH_2CH_2CH_2O-)_xH$$

where $x$ is an integer. Ethylene oxide-propylene oxide mixtures, propylene oxide and the like may be used to make other polyalkylene ether glycols. Glycols may be polymerized in the presence of mineral acid, sulfonic acid or fuller's earth. Still other methods well known to the art may be used in the preparation of polyalkylene ether glycols.

These linear polyether polyols may be represented by the formula: $HO(-R-O-)_xH$, where R is an alkylene or aryl alkylene group and where $x$ is an integer. Moreover, R can be a mixture of alkylene or an alkylene group, for example, alternating groups or blocks of ethylene and propylene radicals, i.e., a polyethylene-propylene ether glycol. Examples of substantially linear polyalkylene ether glycols are polyethylenepropylene ether glycol, polyneopentylene ether glycol, polytetramethylene ether glycol, polypenta methylene ether glycol, polyhexamethylene ether glycol, poly 4-phenyl hexamethylene ether glycol, poly 1,6-heptamethylene ether glycol and the like. To provide for water resistance the polyethers should have at least three carbon atoms between oxygen (ether) linkages. However, some of the carbon chains can consist of 2 carbon atoms so long as there are a predominating number of carbon chains having 3 or more carbon atoms. The average molecular weight of these polyethers may vary from about 180 to about 3,500 or more.

The isocyanates employed are polyisocyanates having 2, 3 or more reactive isocyanato groups. Examples of these isocyanates are hexamethylene, tolylene 2,4-, tolylene 2,6-, diphenyl methane, p,p'-metaphenylene, p-phenylene, naphthalene, dimethyl diphenyl methane and bitolylene diisocyanates and the like and mixtures thereof, such as an 80–20 mixture of 2,4- and 2,6-tolylene diisocyanates or a 65–35 mixture of 2,4- and 2,6-tolylene diisocyanates, naphthalene triisocyanates or other polyisocyanates. Isocyanates may be employed such as those obtained by the reactions of tolylene diisocyanate with glycol, glycerol and the like to make materials having urethane linkages and polyisocyanato end groups. Another useful isocyanate is "Papi-1" (The Carwin Co., North Haven, Conn.) having the general formula

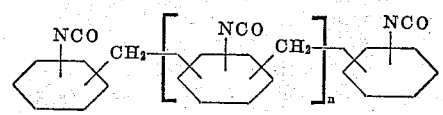

where $n$ has an average value of about 1. Mixtures of polyisocyanates can be used.

While it is possible to use only highly branched polyether polyols and polyisocyanate in making rigid foams, it is preferred to add a hydroxyl terminated crosslinking polyol to the reaction mixture to form the best network for foam formation. The crosslinking material should preferably have at least 3 hydroxyl radicals and may be added to an initial mixture of the polyether polyol and polyisocyanate or can be added to the polyether polyol-polyisocyanate prepolymer after its formation. Sufficient of the crosslinker is added to react with the unreacted isocyanate groups to complete the formation of the polyurethane foam. Examples of useful materials are "Hyprose SP–80" (a sucrose reacted with eight equivalents of propylene oxide to give a compound having about 36 carbon atoms and 8 hydroxyl groups—The Dow Chemical Co.), trimethylol propane, glycerol, 1,2,6-hexane triol, pentaerythritol, N,N,N',N'-tetrakis (2 hydroxyl propyl) ethylene diamine, and other branch chain polyols as well as the branch chain polyether polyols mentioned hereinbefore. Where more flexible products are desired, some of the crosslinker may be linear or substantially linear such as 1,4-butanediol, 1,5-pentanediol, and polypropylene ether glycol, or high molecular weight polyethers, etc.

The polyether-urethane reaction mixture may also desirably contain catalysts and the like, such as tertiary amines etc. Some examples of useful catalysts are N-methylmorpholine, triethyl amine, N,N'-bis(2-hydroxyl propyl)-2-methyl piperazine, dimethyl ethanol amine, tertiary amino alcohols, tertiary ester amines and the like.

Other compounding ingredients may be employed in making the polyurethanes of this invention such as wetting agents, emulsifiers, carbon black, titanium dioxide, mica, wood pulp, silica, color pigments and dyes, paraffin oil, castor oil, fire resistant materials, such as antimony oxide, fungicides, anti-degradants, and the like. Small amounts of water may be added to the mixture to facilitate blowing. Silicones may also be used.

Also inert, inorganic type gases such as $CO_2$ and $N_2O$ may be mixed and dissolved with the liquefied gases. If the reaction proceeds too fast, it may be desirable to add small amounts of polycarboxylic aliphatic acids to slow the reaction. Other ways to control the rate of reaction where the polyether polyol and polyisocyanate tend to react too fast is to wash the material or otherwise remove traces of catalysts and the like which would tend to speed the reaction.

In forming foams, such as a rigid polyether-urethane, it is preferred to make a prepolymer or a mixture or prepolymers which may then be reacted in the presence of the blowing agent with further polyol crosslinking agents. For example, a prepolymer may be made from the reaction of an aromatic polyisocyanate, a trihydric alcohol and a polyether polyol in the ratio of about 2 to 5 equivalents of isocyanate to 1 equivalent total hydroxyl. This prepolymer then may be mixed with various activators and crosslinking materials such as N,N,N,N-tetra kis(2-hydroxyl propyl)ethylene diamine, glycerol, emulsifiers and catalysts in the presence of a suitable amount of the liquid foaming agent. Heat is applied and the mixture allowed to foam to the desired degree. Heating is continued where necessary until curing is completed. The cured polymer may also be further aged if desired. Such prepolymer may be used alone or may be mixed with other prepolymers such as a prepolymer of a triol and an aromatic diisocyanate.

The prepolymer preferably contains residual free isocyanato groups for subsequent reaction with the other crosslinking materials. However, it can be hydroxyl terminated in which case polyisocyanate will have to be added to the reaction mixture. Moreover, it is not necessary to make prepolymer, or prepolymer mixtures but all of the ingredients may be added at once to provide a foamed product.

In general the polyether polyols, polyisocyanates and polyols, when used, are employed in amounts necessary to achieve the desired chain extension, crosslinking, network formation and the like. Foams prepared according to the present invention may or may not have residual unreacted hydroxyl and/or isocyanate radicals. In general, 1 equivalent of the polyether polyol is used with from about 0.5 to 12 equivalents of the polyisocyanate, although these ratios may be varied. Where a polyol crosslinker is employed it may be used in an amount of from 0.05 to 5 equivalents per equivalent of polyether polyols.

The foamed products of the present invention may have densities of from about 1 up to 60 lbs. per cubic foot or higher. Very desirable rigid foam products have a density of from about 1 to 5 lbs./cu. ft. Depending upon the particular method of blowing, amounts of ingredients, type of mold and the like, the products may be open or closed cell. Many of the products of the present invention exhibit a preponderance of fine closed cells. The closed cell or preponderantly closed cell products of this invention retain for at least a considerable period of time the blowing agent in the gaseous state particularly where the agent is a gas at room temperature. It may also exist as a liquid in the cells and may be dissolved in the urethane. These results enhance their insulation value, and particularly, their fire resistant properties where the gas contained in the cells is a fluoroalkane or chlorofluoroalkane. The flexible products are rubbery and, if desired, can be washed and squeezed to rupture the cells and to increase their moisture and vapor transmission. These products exhibit good cell structure, little or no shrinkage and are free from discoloration and crevicing (large hollow irregular fissures or voids in the body of the foam). Moreover, these products when foamed in a cored mold do not exhibit regions of high as compared to low density, contain little or no crust and are substantially uniform. Some of the polyether-urethane foam products of the present invention have K factors (factor of thermal conductivity) as low as 0.122 B.t.u./in./sq. ft./hr./° F. as compared to a polystyrene foam having a K value of 0.22 and a polyether-urethane foam blown with $CO_2$ (from added $H_2O$) having a K value of 0.191. Glass wool has a very much higher K value than the polystyrene foam. Even after ageing for about 60 days at 140° F., the polyether-urethane foams of this invention exhibited K values of only 0.154 B.t.u./in./sq. ft./hr./° F.

The K value for thermal conductivity of the foam of the present invention makes it extremely useful as an insulating material for structures such as refrigerators. For example, it is possible to use a polyether-urethane foam of the present invention of much less thickness to achieve the same insulating efficiency as would be required by a considerably greater thickness of foamed polystyrene, glass wool and other common insulating media. Moreover, the foams of the present invention particularly those of the rigid type, as well as the others, can be foamed in place and are adherent to the walls of the enclosure, thus affording increases in strength or reinforcement. On the other hand glass wool is a dead material in this respect and adds no strength to the walls of the enclosure such as the walls of an ice box or refrigerator. Polystyrene, on the other hand, cannot be foamed in place and requires adhesives. It thus is seen that the use of the present material not only affords better insulation but also permits savings in time and a reduction in the thickness of the steel used in the walls and other structures of a refrigerator and similar articles with the achievement of increased strengths.

In addition to being useful as an insulation material for refrigerators, the foams of the present invention will find utility as crash pads in automobiles, potting compounds, heat and sound insulating bats, mattresses, pillows, seat cushions, door panels, insulated boots, life preservers and rafts, sponges, scouring pads and underlays for carpets and in honeycomb laminates for building construction, airplane construction and hulls and bulkheads of ships.

Moreover, the method of the present invention provides reduced exotherms. The polyether-polyisocyanate foaming action involves a considerable amount of heat. When water is used as the blowing agent to react with the polyisocyanate to release $CO_2$, high exotherms are produced and which often lead to internal decomposition and fissuring of the foam. On the other hand when using applicant's liquid blowing agents, the exotherms are often 20 to 30° C. lower due in part to heat absorbed in vaporizing the liquid blowing agents. Thus decomposition and fissuring are rare. Also, the present process results in a savings in NCO since in water $CO_2$ blown systems a portion of the NCO reacts with the water. Since isocyanates are now the most expensive ingredients of foam manufacture, they are preferably employed for chain extension and/or cross-linking rather than for blowing. Furthermore, in water-blown systems control of temperature, batch size and catalysts must be maintained carefully to coordinate blowing and polyurethane formation in order to obtain densities which are consistent whereas the use of applicant's particular liquefied blowing agents does not necessitate such rigid controls to obtain the desired densities.

EXAMPLE I

A polyether-urethane prepolymer was prepared by reacting 0.94 equivalent of 1,2,6-hexanetriol, 1 equivalent of "Niax Triol" LHT–240 (the triol reaction product of 1,2,6-hexanetriol and propylene oxide and which may contain some mono and dipropylene adducts and having a hydroxyl number of 240—Union Carbide, and 6.85 equivalents of tolylene diisocyanate (an 80/20 mixture of 2,4- and 2,6-tolylene diisocyanates). 180 parts of the prepolymer were then mixed with 37.5 parts of "Quadrol"—N,N,N',N'-tetrakis (2-hydroxy propyl) ethylene diamine (Wyandotte Chem. Co.), 15.5 parts of glycerol, 1 part of Witco 77–86 (an anionic-nonionic emulsifier made by The Witco Chemical Co.), and various amounts of Mobay F–16 (dimethyl amino, N-piperidyl methane made by the Mobay Chemical Co.), DM–16D (a tertiary amine of the general formula NR'R''R''' where R' and R'' are methyl and R''' is a 16 carbon atom alkyl group and made by the Armour Chemical Company), and the liquid blowing agents of the present invention. The mixture was heated when necessary to cause foaming and curing. Several additional runs were made in which the prepolymer reaction was varied slightly as well as some of the amounts of ingredients and the types of blowing agents. The rigid products obtained were examined and tested, and the results found are shown in Table A below:

Table A

[All parts being by weight]

| No. | Prepolymer | Mobay F-16, Parts | DM-16D, Parts | Blowing Agent | Blowing Agent, Parts | Foam Density, lbs./cu. ft. | Results |
|---|---|---|---|---|---|---|---|
| 1 | A | | 0.7 | CFCl₃ | 30 | 2.10 | Good cell structure, uniform. No shrinkage nor discoloration. |
| 2 | A | 1.0 | | CCl₂F—CClF₂ | 41 | 2.52 | Do. |
| 3 | A | 1.0 | | Ethyl chloride | 20 | 2.0 | Good cell structure, uniform. Slight shrinkage, no discoloration. |
| 4 | B | 2.0 | | CHCl₂F | 30 | 1.26 | Do. |
| 5 | B | 2.0 | | CCl₂F—CF₃ | 60 | 4.36 | Good cell structure, uniform. No shrinkage nor discoloration. |
| 6 | C | 1.0 | | n-Pentane | 30 | 2.48 | Good cell structure, uniform. No shrinkage, no discoloration. |
| 7 | C | 1.0 | | n-Hexane | 30 | 2.70 | Do. |
| 8 | C | | 1.0 | Ethylether | 30 | 1.86 | Good cell structure, uniform. Slight shrinkage, no discoloration. |
| 9 | C | | 0.8 | Diisopropyl ether | 40 | 2.04 | Do. |

NOTES:
Prepolymer A—Viscosity, Brookfield (25° C.)—3480 cps.; 23.4% NCO.
Prepolymer B—Viscosity, Brookfield (25° C.)—6400 cps.; 23.8% NCO.
Prepolymer C—Viscosity, Brookfield (25° C.)—9000 cps.; 22.8% NCO.

Differences in viscosities of prepolymers and their available NCO content are due to some variations in methods of mixing and heating and difference in grades and/or manufacturing sources.

The above results show the remarkable advantages in using the blowing agents of the present invention in the preparation of foamed polyurethanes. Moreover, the products obtained were free of dense surface layers or encrustations, that is the objectionable hard, brittle unblown surface crusts were not present. It also will be appreciated that many of the liquid blowing agents described above such as trichloro-trifluoro ethane $$(CCl_2F—CCl—F_2)$$

pentane, hexane, ethylether and diisopropyl ether are normally liquids at room temperature. However, since the foaming operation of the polyurethanes yields somewhat high exotherms, sufficient heat is provided to gasify these blowing agents.

EXAMPLE II

The method of this example was essentially the same as that of Example I, above, except that different liquid blowing agents were employed. The properties of the rigid products obtained after blowing and curing are shown in Table B below:

Table B

| No. | Prepolymer | Mobay F-16, Parts | DM-16D, Parts | Blowing Agent | Blowing Agent, Parts | Foam Density, lbs./cu. ft. | Results |
|---|---|---|---|---|---|---|---|
| 10 | B | 1.0 | | Methylene chloride | 18.6 | 2.62 | Shrinks badly. |
| 11 | C | | 0.8 | Chloroform | 40.0 | 2.90 | Decomposed, brown and creviced (fissured). |
| 12 | C | 1.0 | | Acetone | 12.7 | | Shrinks badly.[1] |
| 13 | C | 1.0 | | Propylene oxide | 12.7 | | Do.[1] |
| 14 | C | 1.0 | | Ethylacetate | 19.3 | | Do.[1] |
| 15 | C | 1.0 | | Benzene | 17.1 | | Do.[1] |
| 16 | C | 1.0 | | Acetonitrile | 9.0 | | Shrinks badly, creviced (fissured).[1] |
| 17 | D | 1.0 | | Ethylene chloride | 21.6 | 15.0 | Badly creviced (fissured); Slight Shrinkage. |
| 18 | D | 1.0 | | Tetrahydrofuran | 15.8 | 6.5 | Badly creviced (fissured). |

[1] Due to bad shrinkage, etc., density was not determined.

NOTES:
Prepolymer B—Viscosity, Brookfield (25° C.)—6400 cps.; 23.8% NCO.
Prepolymer C—Viscosity, Brookfield (25° C.)—9000 cps.; 22.8% NCO.
Prepolymer D—Viscosity, Brookfield (25° C.)—6300 cps.; 23.1% NCO.

This example illustrates the fact that the use of unstable, active, decomposable blowing agents causes shrinkage, discoloration, crevicing and will not provide the desired results. Moreover, when ammonia, NH₃, was used as the blowing agent in the polyether polyol, polyol, polyisocyanate reaction mixture, unsatisfactory results were obtained since the ammonia reacts rapidly with the polyisocyanate.

EXAMPLE III 180 parts of prepolymer C (see previous examples) were mixed with 25 parts of Quadrol, 15.5 parts of glycerol, 35 parts "Niax Triol" LHT-240 and varying amounts of liquid n-pentane (blowing agent) and DM-16D, all parts being by weight. The resulting materials were allowed to foam in sections up to five inches thick. The results obtained are shown below:

| Parts of n-Pentane | Parts of DM-16D | Density of Polyether-Urethane Foam, lbs./cu. ft. | Results |
|---|---|---|---|
| 1.5 | 1.0 | 31.4 | Good cell structure, little or no crevicing (fissuring). |
| 4.0 | 1.5 | 19.6 | |
| 10.0 | 1.5 | 6.4 | |
| 4.0 | 0.8 | 16.5 | |

These results show that good high density rigid foams can be made by the practice of the present invention. Moreover, in spite of the fact that in making these high density foams, the reactants are concentrated into a smaller volume and less blowing agent is volatilized to result in higher exotherms, little or no crevicing or fissuring occurred. This may be due to the fact that insufficient internal pressures develop or that the polyurethane network or crosslinking formation was sufficiently fast or strong to resist such pressures.

EXAMPLE IV

A prepolymer was prepared by reacting 1 equivalent of LHT-240 (see above examples) and 2.86 equivalents of an 80/20 mixture of 2,4-/2,6-tolylene diisocyanates to give a prepolymer having about 15.6% available NCO and a Brookfield viscosity at 25° C. of 32,000 cps. 100 parts of this prepolymer were then mixed with 13.5 parts of Quadrol, 5.7 parts of glycerol, 0.5 part of Witco 77–86, and varying amounts of Mobay F–16, DM–16D and n-pentane, all parts being by weight. After foaming and curing, the following properties were exhibited by the rigid polyurethane:

| F–16, Parts | DM–16D, Parts | n-Pentane, Parts | Density of Foam, lbs./cu.ft. | Exotherm, ° C. | Results |
| --- | --- | --- | --- | --- | --- |
| ------ | ------ | 15 | 2.48 | 84 | Good cell structure, no shrinkage. |
| ------ | 0.6 | 15 | 3.32 | 94 | Do. |
| 0.5 | 0.5 | 20 | 2.26 | 78 | Do. |

The exotherm is a measure of the exothermic heat of reaction. Here, foams are obtained which have a low density and good cell structure and which exhibit no shrinkage. They, also, have an exotherm below 100° C. or 212° F. which makes them ideally suited for the purpose of potting compounds and the like where the heat during the potting operation must not be so high as to injure the material being potted.

When a small portion of the branched chain polyols and polyether polyols of the examples is replaced with linear or substantially linear polyols and polyether polyols, semi-rigid foams are obtained. When more of these linear or substantially linear polyols and/or polyetherpolyols are used, more flexible foams are obtained.

Furthermore, it is to be understood that in accordance with the provisions of the patent statutes, the particualr form of product shown and described and the particular procedures set forth are presented for purposes of explanation and illustration and that various modifications of said product and procedure can be made without departing from my invention.

Having thus described my invention, I claim:

1. The method of making a polyether-urethane foam which comprises reacting an essentially hydroxyl terminated polyether polyol with an organic polyisocyanate in the presence of from about 2 to 40% by weight based on the total weight of said polyether-urethane forming material of an insert, stable, vaporizable liquid having a boiling point below about 110° C. and being selected from the group consisting of the lower molecular weight alkanes, alkenes and halogen-substituted lower molecular weight alkanes having at least one substituted fluorine atom and at a temperature sufficient to vaporize said liquid and to form a foamed polyetherurethane product.

2. The method according to claim 1 in which said polyether polyol contains from 3 to 8 hydroxyl groups and said polyisocyanate is an aromatic isocyanate containing from 2 to 3 isocyanato groups.

3. The method according to claim 2 in which the reaction mixture of said polyether polyol, said polyisocyanate and said vaporizable material contains additionally a polyol having from 3 to 8 hydroxyl groups.

4. The method according to claim 3 in which said vaporizable liquid is present in the reaction mixture in an amount of from about 9 to 30% by weight based on the total weight of the polyether-urethane forming materials and in which said reaction mixture contains additionally a small amount of water.

5. The method according to claim 4 in which said vaporizable liquid is a low molecular weight alkane.

6. The method according to claim 4 in which said vaporizable liquid is a chlorofluorinated alkane.

7. The method according to claim 4 in which said vaporizable liquid is an alkene.

8. The method of making a rigid polyether-urethane foam which comprises reacting together an aromatic diisocyanate and a branch chain polyether polyol having from 3 to 8 hydroxyl groups to obtain a prepolymer having an excess of reactive isocyanato groups, mixing, an inert vaporizable, stable liquid halogen-substituted lower molecular weight alkane having at least one substituted fluorine atom having a boiling point below about 110° C. and at least one material having from 3 to 8 hydroxyl groups and being selected from the group consisting of polyols and polyether polyols, with said prepolymer at a temperature sufficient to vaporize said substituted alkane and permitting the resulting reaction mixture to foam and crosslink to form a rigid cellular polyether-urethane foam, said liquid substituted alkane being present in an amount of from about 9 to 30% by weight based on the total weight of said polyether-urethane forming materials.

9. The method of making a rigid polyether-urethane foam which comprises reacting at least one branch chain polyether polyol having from 3 to 8 hydroxyl groups and a polyol having from 3 to 8 hydroxyl radicals with an organic polyisocyanate in an amount sufficient to provide a polyether-urethane prepolymer having an excess of isocyanato groups, mixing said prepolymer with an inert, stable, vaporizable liquid fluorine and chlorine substituted alkane having a boiling point below about 110° C. and with at least one crosslinker having from 3 to 8 OH groups and being selected from the class consisting of polyether polyols and polyols at a temperature sufficient to vaporize said fluorine and chlorine substituted alkane, to react said prepolymer and crosslinker and to foam the resulting reaction mixture to form a rigid cellular polyether-urethane, said substituted alkane being present in an amount of from about 9 to 30% by weight based on the total weight of the polyether-urethane forming reactants.

10. An essentially hydroxyl terminated polyether polyol/organic polyisocyanate-polyurethane foam, said foam possessing a density of from about 1 to 60 pounds per cubic foot, said foam comprising closed cells containing trapped therein an inert, stable material selected from the group consisting of lower molecular weight alkanes, alkenes and halogen-substituted alkanes, the latter having at least one substituted fluorine atom and said material having a boiling point below about 110° C.

11. A rigid, organic polyether-urethane foam according to claim 10 in which said material is a chlorofluorinated alkane.

12. An organic polyether-urethane foam according to claim 10 in which said material is a fluorine and chlorine substituted lower molecular weight alkane.

13. An organic polyether-urethane foam according to claim 12 in which said material is $CCl_2F$—$CF_3$.

14. An organic polyether-urethane foam according to claim 12 in which said material is $CFCl_3$.

15. An organic polyether-urethane foam according to claim 12 in which said material is $CCl_2F$—$CClF_2$.

16. An organic polyether-urethane foam according to claim 10 in which said vaporizable material is a lower molecular weight alkane having not in excess of six carbon atoms.

17. The method of making a polyether-urethane foam which comprises mixing a prepolymer of the reaction product of an essentially hydroxyl terminated polyether polyol with an organic polyisocyanate with from about 2 to 40% by weight based on the total weight of the polyether-urethane forming materials of an inert, stable, vaporizable liquid having a boiling point below about 110° C. and being selected from the group consisting of the lower molecular weight alkanes, alkenes, and halogen-substituted lower molecular weight alkanes having at least one substituted fluorine atom and causing the resulting mixture to expand at a temperature sufficient to vaporize said inert, stable, vaporizable liquid and to crosslink said prepolymer.

References Cited in the file of this patent

UNITED STATES PATENTS

| | | |
|---|---|---|
| 2,830,037 | Carter | Apr. 8, 1958 |
| 2,848,428 | Rubens | Aug. 19, 1958 |
| 2,850,464 | Mitchell | Sept. 2, 1958 |
| 2,866,774 | Price | Dec. 30, 1958 |
| 2,888,409 | Bender et al. | May 26, 1959 |

FOREIGN PATENTS

| | | |
|---|---|---|
| 860,109 | Germany | Dec. 18, 1952 |
| 519,547 | Belgium | May 15, 1953 |

Dedication 3,072,582.—*Charles Bedell Frost*, Glendora, Calif. POLYETHER-URETHANE FOAMS AND METHOD OF MAKING SAME. Patent dated Jan. 8, 1963. Dedication filed Nov. 15, 1976, by the assignee, *The General Tire & Rubber Company*.

Hereby dedicates to the Public the remaining term of said patent.

[*Official Gazette August 29, 1978.*]